May 9, 1967     R. R. KOOIMAN ETAL     3,319,155
ELECTRICAL CALIBRATION DEVICE FOR STRAIN GAGE BRIDGES
Filed Nov. 30, 1964     2 Sheets-Sheet 1

INVENTORS
ROBERT R. KOOIMAN
BY EARL A. GRINDHEIM
Dugger Braddock Johnson & Westman
ATTORNEYS United States Patent Office 3,319,155
Patented May 9, 1967

3,319,155
ELECTRICAL CALIBRATION DEVICE FOR
STRAIN GAGE BRIDGES
Robert R. Kooiman, Eden Prairie, and Earl A. Grindheim, Minneapolis, Minn., assignors to Rosemount Engineering Company, Minneapolis, Minn., a corporation of Minnesota
Filed Nov. 30, 1964, Ser. No. 414,524
9 Claims. (Cl. 323—75)

This invention relates to measurement apparatus and more particularly to electrical calibration simulation apparatus for impedance bridge type measuring devices.

The use of impedance bridges as test or measurement equipment is well-known in the art. One commonly used configuration is a balanced resistance bridge having four arms with one or more resistance elements in each arm, and having a pair of input terminals and a pair of output terminals. When the bridge is balanced an electromotive force may be placed across the input terminals, and there will be no output across the output terminals. A common practice is to have one or more of the arms contain a condition responsive or otherwise active device which varies the resistance of the arm to unbalance the bridge and causes an output to appear across the output terminals. The output voltage or current can be correlated to the change in the bridge arms and this makes the bridge quite useful as a measuring or sensing device.

The output of such bridges is dependent on the input voltage, the change of impedance of the bridge arms, and also depends on the response of readout or measuring equipment used with the bridge. Changes in temperature can cause changes in impedance of the bridge arms, but this is easily compensated for by using identical impedances and by subjecting all of the impedances to the same environment. If all impedances change a like amount, the bridge will remain balanced. The drift in the input voltage and drift in readout equipment is unpredictable and in order to know that the bridge is working and to obtain accurate results the system must be calibrated often.

In conventional wire resistance strain gage work, assuming a four arm resistance bridge with a resistor in each arm, a known method of electrical calibration simulation is to parallel one or more of the arm resistors with another larger resistor. If a resistor of about two hundred times the resistance of the arm resistors is chosen, the parallel combination will result in a change in arm resistance of approximately .5%. Note that the large value of the parallel resistor makes the resistance of the connecting leads negligible, so that the large calibrating resistor may be remote from the bridge. This method of electrical calibration simulation is adequate and useful for wire resistance strain gage bridges having active elements that have a small normal range of impedance change (usually less than .5%). The large resistor actually unbalances the bridge as much as a normal load would and the large value resistor used makes the lead resistance negligible. Further, wire strain gages don't change resistance greatly with a change of temperature, so the shunt resistance provides fairly accurate calibration over a wide range of temperature.

However, with the advent of new bridge elements, such as semiconductor elements, the above-described method is no longer usable. The new semiconductor elements typically may change 2% to 10% in impedance under applied load in response to strains, and have a temperature coefficient of resistance change about one hundred times greater than the conventional wire strain gage elements. In order to calibrate these gages in their normal working ranges, a small shunt resistor would have to be used and the effect of lead resistance becomes significant, as well as the change in resistance of the bridge arms due to temperature changes.

This invention provides new electrical calibration simulation apparatus which can accurately calibrate bridges having semi-conductor elements in the arms of the bridge without concern about the effects of temperature. It has been discovered that by feeding a current from an electromotive force, usually through a calibration impedance, to a small known portion of the impedance of one or more of the semi-conductor bridge arms, the bridge will be unbalanced an amount to simulate a known applied strain to provide known electrical calibration within the normal working range of arm element impedance variations. The calibration is substantially independent of the resistance of the active portion of the arm resistance and therefore, even if the semi-conductor changes greatly in resistance because of temperature change, the calibration will be accurate.

It is therefore an object of this invention to provide accurate calibration simulation apparatus for an electrical test or measurement bridge in which the bridge arms have a relatively large change in impedance over its operating range.

A further object of this invention is to provide an impedance bridge with calibration simulation apparatus by which the bridge and readout equipment may be accurately calibrated despite large changes in the impedance of the bridge elements due to environmental changes.

These and other objects of this invention will become apparent upon consideration of the following claims, specification and drawings, of which:

FIG. 1 is a schematic representation of a four arm resistance bridge including a first embodiment of the calibrating apparatus of this invention;

Figure 5:
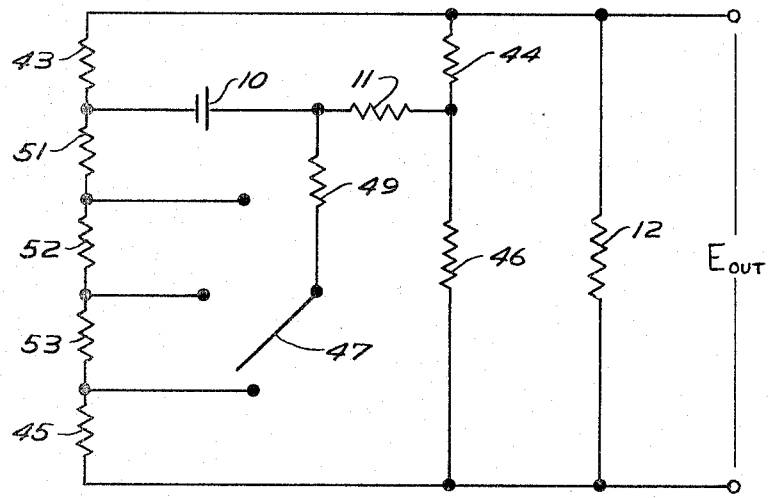
Figure 6:
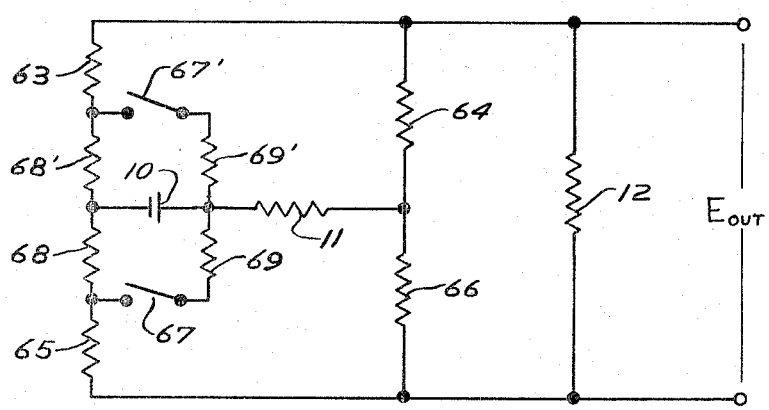

FIG. 5 is a schematic representation of the resistance bridge including a third embodiment of the calibration apparatus of this invention which may be used to provide a plurality of electrical calibration simulation values; and FIG. 6 is a schematic representation of the resistance bridge including a fourth embodiment of the calibration apparatus of this invention which may be used to provide electrical calibration simulation in a plurality of the arms of the bridge.

Figure 1:
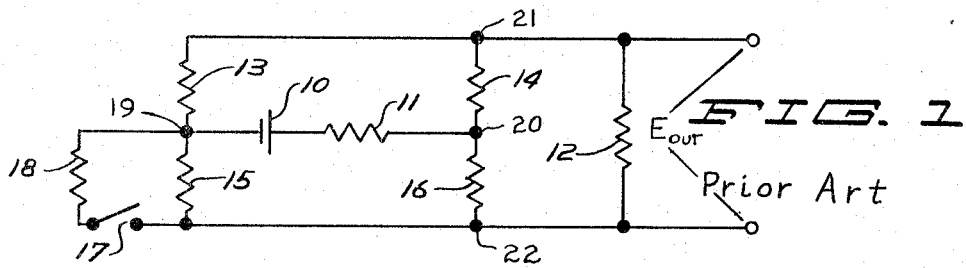
FIG. 1 is a schematic representation of a prior art four arm resistance bridge including a parallel or shunt resistor for calibration simulation.

Referring to the drawings and the numerals of reference thereon, in the prior art shown in FIG. 1, there is a resistance bridge comprising resistance elements 13, 14, 15 and 16 having respectively, resistance values $R_{13}$, $R_{14}$, $R_{15}$, and $R_{16}$. Resistance element 15 (as shown) is chosen to be condition responsive or "active" in that its resistance will vary in the presence of a change of environmental condition, such as a change in strain (a strain gage). All arms can be active, if desired. Resistance elements 13 and 14 are serially connected between a pair of input terminals 19 and 20. Resistance elements 15 and 16 are also serially connected between input terminals 19 and 20. There is also shown an input circuit comprising a source of voltage 10 and a resistor 11 serially connected across input terminals 19 and 20. An output or load resistor 12 is shown connected across a pair of output terminals 21 and 22. A calibration resistor 18 is connected, through a switch 17, across resistance element 15.

It is well-known that if resistance elements 13, 14, 15 and 16 are chosen such that $R_{13}/R_{14}=R_{15}/R_{16}$, the bridge will be balanced and zero output voltage will be felt across resistor 12. It is also known that the resistance of element 15 will vary by a specific percentage when subjected to a particular strain. Resistor 18 may be placed in parallel with resistance element 15, by closure of switch 17, to effectively vary the resistance of element 15 by the specific percentage (if the resistor 18 is properly selected and $R_{15}$ is known). The resulting unbalance of the bridge will cause a voltage to be felt across output resistor 12, which voltage may be used through an amplifier if desired, to drive a meter, recorder or other readout equipment. The reading on the meter will indicate the amount of output when that bridge arm 15 is subjected to the equivalent strain. Another way is to adjust the gain of the amplifier or the input voltage to obtain the correct indication on the readout equipment. Thus when the output of the bridge equals this during use, the strain on element 15 is known.

Different values of resistors can be used to calibrate the bridge and readout equipment at different outputs and thereby establish a calibration curve for the equipment. This method of calibration is normally used when the maximum variance of the resistance of active element 15 is about .5%, and where resistance element 15 has a low resistance change with respect to environmental (temperature) changes. If the range of variance is only .5%, the resistance of resistor 18 may be more than two hundred times greater than that of element 15 in order to calibrate at the maximum normal values of strain on element 15 and the resistance of the lead wires connecting resistor 18 to the bridge will be negligible.

The resistor 18 will also provide accurate calibration over a wide change of environmental conditions. However, if the range of resistance variance of the active bridge arms is greater than .5% the resistance of the calibration resistor must be correspondingly smaller to obtain an output that is similar to that obtained under working conditions. With small calibration or shunt resistors the resistance of the lead wires then becomes significant.

Also, if the bridge arms have a high change of resistance with respect to environmental conditions, use of a parallel connected calibration becomes impractical because it would be correct at only one set of environmental conditions. The increased use of semiconductor resistance elements or strain gages in bridges, which elements commonly have a variance in resistance of 2.0% to 8.0% under normal conditions of strain and a coefficient of resistance of one hundred times greater than wire strain gages, has made the above-described prior art method of electrical calibration simulation unusable.

Figure 2:
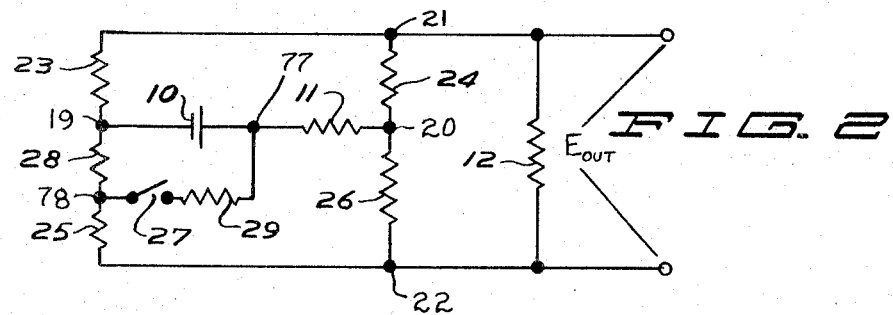

A first embodiment of this invention is shown in FIG. 2, which discloses a resistance bridge comprising resistance elements 23, 24, 25 and 26 and a resistor 28 in series with element 25 in one arm of the bridge. All four of the arms can be condition responsive or "active." Resistance elements 23 and 24 are serially connected between a pair of input terminals 19 and 20, while resistance elements 28, 25 and 26 are also serially connected between input terminals 19 and 20. Resistance elements 23, 24 and 26 are all chosen to have a resistance value $R_a$. The resistance value of resistor 28 is $R_h$, while the resistance of resistance element 25 is equal to $R_a$ minus $R_h$, herein designated $R_{a-h}$. It will thus be apparent that as shown the bridge is balanced since each arm of the bridge has the same resistance value, $R_a$. The resistance elements 23, 24, 25 and 26 all change resistance when subject to strain, however, adjacent arms changing with opposite sign.

It is also apparent that the bridge will remain balanced only so long as the ratio of $R_{24}$ to $R_{23}$ is identical to the ratio of $R_{26}$ to ($R_{25}$ plus $R_{28}$). The embodiment of FIG. 2 has been shown in the simplest form where the resistances designated 23, 24, 25 are all equal and also equal to the sum of $R_{25}$ and $R_{28}$. The requirement of constancy of bridge balance under varying temperature conditions requires the above ratio relationship to be constant. This constancy of the ratios may be accomplished in various ways. As specifically shown in FIG. 2, this constancy is maintained if the sum of $R_{25}$ and $R_{28}$ is always equal to $R_{26}$. Bridge balance will be maintained then if $R_{28}$ changes with respect to temperature in the same manner as $R_{25}$ and $R_{26}$. In some embodiments it is desirable to select $R_{28}$ of material which has essentially no sensitivity to temperature while $R_{25}$ may change appreciably with temperature. In such cases bridge balance may be maintained by making $R_{23}$ identical to $R_{25}$ and inserting resistance $R_{28}$ into each of the bridge arms $R_{23}$ and $R_{25}$. This ensures that the ratios of the bridge halves remain equal even though the ratio value may change with temperature. It is apparent that the added resistance $R_{28}$ could be added in each arm of the bridge to ensure equal bridge arms if this is a desired characteristic of the bridge. The particular method of maintaining bridge balance is a design choice and is not a limitation of the embodiment discussed.

An input circuit is shown comprising a source of input voltage 10 and a resistor 11 serially connected across input terminals 19 and 20. Resistor 11 has a resistance value $R_{11}$. An output resistor 12, having a resistance value $R_{12}$, is connected across a pair of output terminals 21 and 22. A calibration resistor 29, having a resistance value $R_{29}$, has one end connected to a junction 77 between source 10 and resistor 11, and another end connected through a switch 27 to a junction 78 between resistance element 25 and resistor 28.

To achieve electrical calibration simulation, switch 27 is closed. A current will then flow from source 10 through resistor 29, switch 27, resistor 28, and back to source 10. This current will cause an unbalance of the bridge and an output voltage to be felt across resistor 12. By designating the value of the source of voltage 10 as $E_{in}$, and the value of the output voltage as $E_{out}$, it may be shown that:

$$E_{out}=\frac{E_{in}\left(1-\dfrac{R_h/R_a}{2+2R_{11}/R_a}\right)}{2\left(1+\dfrac{R_{29}}{R_h}\right)\left(1+\dfrac{R_a}{R_{12}}\right)-\dfrac{R_h}{R_a}\left(\dfrac{1+R_{11}/2R_a}{1+R_{11}/R_a}\right)\left[1+\dfrac{R_a}{R_{12}}\left(\dfrac{3+2R_{11}/R_a}{2+R_{11}/R_a}\right)\right]} \qquad (1)$$

If the resistance value $R_{12}$ is chosen to be much greater than $R_a$, then $R_a/R_{12}$ will be much less than 1. If the resistance value $R_a$ is chosen to be much greater than $R_h$, then $R_h/R_a$ will also be much less than 1 (and $R_{a-h}$ will be very close to the same as $R_a$). Assuming these proper values are chosen, the above formula may be approximated by:

$$E_{out}=\frac{E_{in}}{2(1+R_{29}/R_h)} \qquad (2)$$

This last formula makes it apparent that the output voltage is directly proportional to the input voltage and is a function of the ratio $R_{29}/R_h$. The resistance of the bridge arms may vary widely with a change in environmental conditions without affecting the accuracy of the calibration simulation, as long as the ratio $R_{29}/R_h$ remains substantially constant. This constancy may be obtained by selecting resistors 28 and 29 of similar stable resistance materials, having identical coefficients of resistance with respect to changes in environmental conditions.

The ratio of $R_{29}/R_h$ is selected so that the output of the bridge will be a simulation of a predetermined strain. The strain simulated will be in the normal working range of the transducer. The readout equipment is thus directly calibrated quickly and easily. Each time the calibration device is used the output will be equivalent to this predetermined strain.

Figure 3:
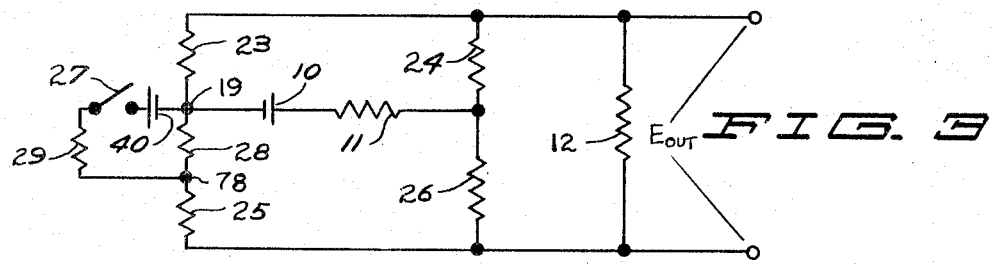
FIG. 3 is a schematic representation of the resistance bridge including a second embodiment of the calibrating apparatus of this invention.
Figure 4:
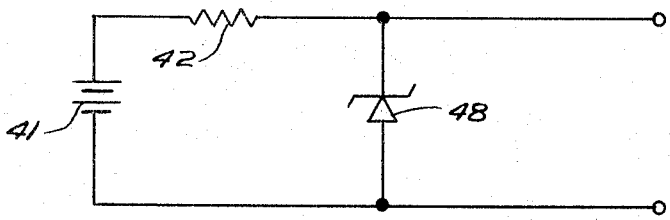
FIG. 4 is a schematic representation of an accurate reference power supply which may be used in the embodiment of FIG. 3.

The circuit of FIG. 3 is shown to illustrate the application of this invention to situations where it is desired to actuate calibration simulation by application of a voltage signal rather than the switching function used in the circuit of FIG. 2. The construction of the circuit is the same as in FIG. 2, except that calibrating resistor 29, switch 27, and a source of calibrating voltage 40 are now serially connected between input terminal 19 and junction 78. Source 40 may preferably be the well-known Zener diode regulated power supply shown in FIG. 4. All resistance values are the same as described in the discussion of FIG. 2. Source 40 has a voltage value $E_{cal}$.

To unbalance the bridge, switch 27 is closed, which will cause a current to flow from source 40, through switch 27, resistor 29, resistor 28, and back to source 40. The bridge unbalance caused by this current will result in an output voltage $E_{out}$ across output resistor 12. Analysis of this circuit will reveal that the equation for the value of the output voltage may be approximated by:

$$E_{out} = \frac{E_{cal}}{2(1 + R_{29}/R_h)} \quad (3)$$

which again indicates that accurate calibration simulation may be achieved simply by keeping a constant ratio, $R_{29}/R_h$. Also, the value of $E_{cal}$ should be known.

FIGS. 5 and 6 are embodiments of this invention disclosing, respectively, apparatus for providing a plurality of calibration simulation signal values and apparatus for providing calibration simulation signals to a plurality of arms of the bridge. In FIG. 5 the resistance elements 43, 44 and 46 have a resistance equal to $R_a$ while resistors 51, 52 and 53 have a resistance equal to $R_h$ and resistance element 45 has a resistance equal to $R_{a-h}$. It can easily be seen that moving the multiposition switch will cause different outputs (different values of simulated strain) to establish a calibration curve. Thus for critical work, if the readout equipment is not linear in response over the entire working range of the gage, more accurate calibration is possible. Resistor 49 takes the place of $R_{29}$. The analysis of this embodiment will yield the same conclusions as the analysis of FIG. 2. It is also apparent that resistor 49 could be connected permanently to the point between 53 and 45 and switch 47 could be operated between electromotive force 10 and segments of resistor 49 to give the same multiselection signals.

In FIG. 6 the resistance elements are 63, 64, 65 and 66 with resistors 68 and 68' having a value $R_h$ and 63 and 65 equal when 64 and 66 have a value of $R_a$. The calibration resistors 69 and 69' replace resistor 29 and when switches 67 and 67' are used in this way more than one bridge arm can be calibrated to give opposite polarity of output signal.

It is important to note that for ease of derivation and clarity of disclosure, the bridge configurations of FIGS. 2 and 3 were treated as balanced resistance bridges. However, the apparatus of this invention will apply also to unbalanced impedance bridge configurations. Derivation of the final equations will be more complicated, but will yield the same result, that is, accurate calibration simulation is dependent substantially on the constancy of the ratio, $R_{29}/R_h$.

Many apparently widely different embodiments of this invention may be made without departing from the spirit and scope thereof, and it is to be understood that this invention is not limited to the specific embodiments disclosed herein.

What is claimed is:
1. An electrical calibration device comprising a resistance bridge having four resistance arms wherein the resistance of at least a first of said arms changes in response to a change in a physical parameter which is to be measured, means to provide a bridge excitation voltage supply, means to indicate unbalance of the bridge, switching means movable to open or close an electric circuit connected therethrough, a first resistance and a second resistance separate from the resistance arms, said first and second resistances having a known ratio of resistance, said first resistance being part of the resistance in one arm of said bridge and substantially smaller than the total resistance of the arm, said second resistance being serially connected to said switching means and said first resistance, and voltage supply means, said voltage supply means being electrically connected in series with said switching means and first and second resistance.

2. The electric calibration device of claim 1 wherein the means to provide a bridge excitation voltage includes first and second bridge input terminals, and wherein one end of the first resistance is connected to one of the input terminals.

3. The device of claim 1 wherein the voltage supply is a known voltage.

4. The device of claim 1 wherein the voltage supply means is separate from the bridge excitation voltage supply.

5. An electrical calibration device of claim 1 in which the voltage supply means is the excitation voltage supply for the bridge.

6. An electrical calibration device as described in claim 1 wherein each of a plurality of arms has a first resistance and the first resistances are respectively serially connected through separate switching means, and separate second resistances.

7. An electrical calibration device as described in claim 1 wherein said first resistance comprises a plurality of measurable parts, said switching means including a plurality of separate connection means between it and said first resistance to permit connection of said second resistance and said voltage supply means serially with different portions of said first resistance to thereby change the value of said known ratio.

8. An electrical calibration device of claim 1 wherein the bridge is a semiconductor strain gage bridge.

9. Circuitry for generating an electrical output signal from an impedance bridge having four arms, first and second voltage excitation terminals, first and second output terminals, and a voltage excitation source connected to the excitation terminals, wherein the magnitude of said output signal has a known relation to a change in relative impedance of the bridge arms comprising:

a first impedance having first and second ends which is a small part of one of the bridge arms connected at its first end to the first voltage excitation terminal and serially connected at its second end to the remaining part of the bridge arm, switching means for closing and opening a circuit, and a second impedance having first and second ends connected in series with the switching means between the second end of the first impedance and the second voltage excitation terminal, whereby actuation of the switching means to a closed position causes a current to pass through the series circuit comprising the voltage excitation, the second impedance and the first impedance thereby giving a voltage signal at the first and second output terminals.

References Cited by the Examiner
UNITED STATES PATENTS

| | | | |
|---|---|---|---|
| 2,476,384 | 7/1949 | Razek. | |
| 2,803,799 | 8/1957 | Siegel et al. | 324—63 |
| 2,876,417 | 3/1959 | Winram | 324—130 X |
| 3,161,821 | 12/1964 | Price et al. | |

JOHN F. COUCH, *Primary Examiner.*

A. D. PELLINEN, *Assistant Examiner.*